United States Patent [19]

Graham

[11] Patent Number: 4,517,721
[45] Date of Patent: May 21, 1985

[54] METHOD OF MAKING A TUBE IN SHEET HEAT EXCHANGER

[75] Inventor: William R. Graham, Cambridge, England

[73] Assignee: TI (Group Services) Limited, Birmingham, England

[21] Appl. No.: 654,533

[22] Filed: Sep. 26, 1984

Related U.S. Application Data

[63] Continuation of Ser. No. 396,064, Jul. 7, 1982, abandoned.

[30] Foreign Application Priority Data

Jul. 9, 1981 [GB] United Kingdom ............... 8121189

[51] Int. Cl.³ .......................................... B21D 53/08
[52] U.S. Cl. ......................... 29/157.3 C; 29/157.3 R; 29/412; 29/416; 29/414; 126/447
[58] Field of Search ............... 29/157.3 C, 412, 414, 29/413, 416, 157.3 R, 415; 165/171; 126/446, 447, 450

[56] References Cited

U.S. PATENT DOCUMENTS

| | | | |
|---|---|---|---|
| 3,552,341 | 1/1971 | Lannin | 29/416 X |
| 3,554,557 | 1/1971 | Fortune | 29/416 X |
| 3,616,518 | 11/1971 | Hundy | 29/416 X |
| 3,848,309 | 11/1974 | Nuss | 29/416 X |

FOREIGN PATENT DOCUMENTS

| | | | |
|---|---|---|---|
| 2530152 | 2/1977 | Fed. Rep. of Germany | 126/446 |
| 1565092 | 4/1980 | United Kingdom | 29/157.3 C |

Primary Examiner—Howard N. Goldberg
Assistant Examiner—John T. Burtch
Attorney, Agent, or Firm—Kemon & Estabrook

[57] ABSTRACT

A heat exchanger having a heat absorbing or radiating panel formed from a plate which is mounted in thermal contact with a pipe or series of pipes. The panel is mounted within a seamless frame member, joining means being interposed between the panel and frame member, to locate adjacent edges of the panel and frame member and secure them together. The plate forming the panel and the frame member may be made from a single sheet of material in a single forming operation.

6 Claims, 7 Drawing Figures

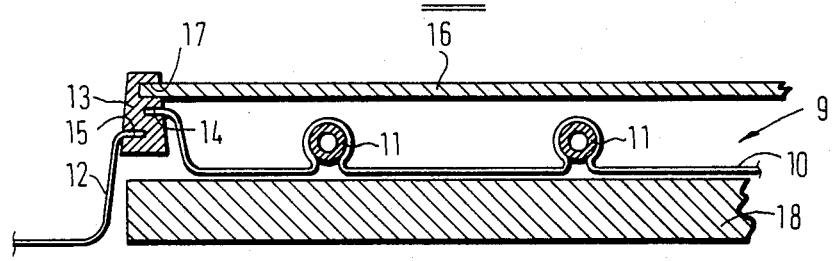
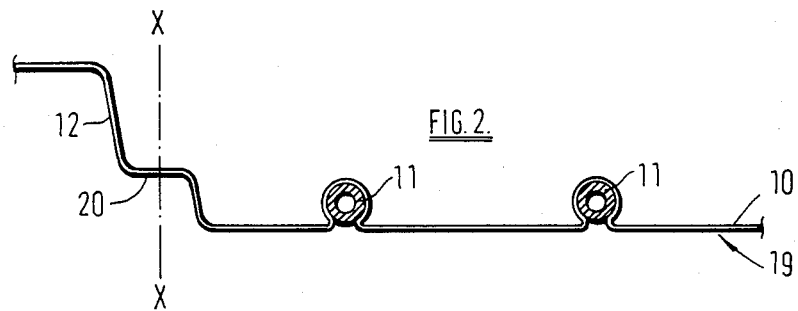
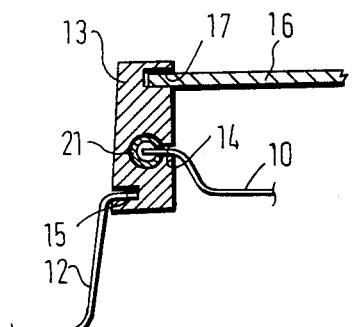
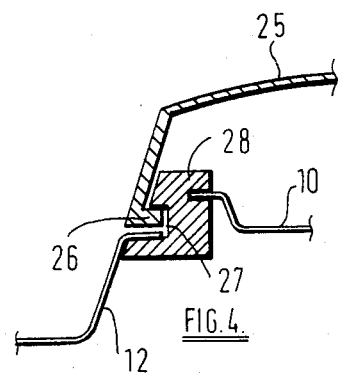

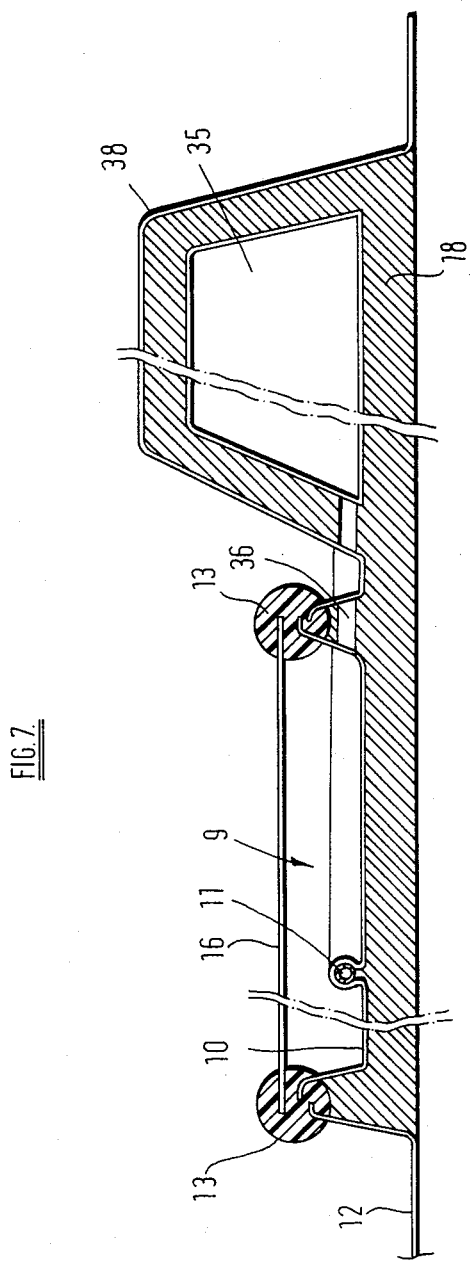

METHOD OF MAKING A TUBE IN SHEET HEAT EXCHANGER

This application is a continuation of application Ser. No. 369,064, filed July 7, 1982, now abandoned.

This invention relates to heat exchangers, and in particular, although not exclusively, to solar heating panels.

It is known to form solar heating panels from a metal plate, to which is attached a pipe or pipes through which a heat transfer medium may be circulated. One such solar heating panel may be formed in accordance with British Patent Specification No. 1565092.

Hitherto such panels have been formed for assembly in specifically designed installations or alternatively it has been necessary to house the panel in a glazed case or box, formed, for example, from aluminium extrusions. Such cases or boxes are, however, relatively expensive as compared to the cost of the panel and add considerably to the overall cost of an installation.

The present invention provides a heat exchanger unit which is suitable, for example, for domestic solar heating systems which may be installed on existing tiled roofs and may be manufactured economically.

According to one aspect of the present invention a heat exchanger comprises; a heat absorbing or radiating panel formed from a plate having a tube or tubes, through which a heat exchange medium may be circulated, mounted in thermal contact therewith; a seamless frame member formed from sheet material surrounding the panel; and joining means interposed therebetween to locate adjacent edges of the frame member and the panel and secure them together.

Preferably the joining means by which the panel is secured to the frame member is a moulding or extrusion which extends around the whole or a substantial part of the periphery of the panel. Formations are provided in the moulding or extrusion for engaging the outer periphery of the panel and the adjacent periphery of the frame member, in spaced apart relationship. Preferably the moulding or extrusion is formed from a heat insulating material, or alternatively heat insulating inserts are provided between the panel and the moulding or extrusion.

The heat exchanger may be provided with a transparent cover made of glass or plastics material, particularly where it is to be used as a solar heating panel. The cover may be retained in position by additional formations on the moulding or extrusion or by formations on the frame member. Layers of insulating material may be provided on the underside of the panel, within the frame member. These insulating layers may be installed when the heat exchanger is assembled and may be retained in place by a suitable backing sheet, or alternatively the insulating layer may be injected into the cavity beneath the panel, after installation of the heat exchanger unit at its operational site.

In some applications, for example thermosiphon solar collector systems, it is desirable to have a heat exchanger fluid storage tank, positioned adjacent to the heat exchanger. In accordance with the present invention, a cover may also be provided for such a tank. Conveniently this cover will be provided as part of the frame member, although it is conceivable that it could be provided as part of the panel or as a separate panel located within the frame member. Similarly, covers may be provided for other components which are to be associated with the heat exchanger, for example pumps or valves.

According to a further aspect of the present invention, a method of forming a heat exchanger comprising a heat absorbing or radiating panel formed from a plate having a tube or tubes, through which a heat exchange medium may be circulated, mounted in thermal contact therewith, a seamless frame member formed from sheet material surrounding the panel and joining means interposed therebetween for securing the panel at its periphery to the frame member; includes the steps of forming the plate and the frame member, from a single sheet of material in a single forming operation, parting the plate from the frame member and reassembling them inserting joining means therebetween, to secure the plate, at its periphery, to the frame member.

This method of manufacturing is particularly suitable for the manufacture of heat exchangers from superplastic metals. With such materials, the tube or tubes may be embedded in the plate, in the manner claimed in British Patent Specification No. 1565092, at the same time as the plate and frame member are formed. The panel is then separated from the frame member by cutting around the appropriate contour of the formed sheet. The method may however be used with conventional sheet metals, using a pressing operation to form simultaneously the plate and the frame member. The tube or tubes may then subsequently be secured to the plate by any suitable method, for example soldering or brazing. Where a pressing operation is used, the press tools may be arranged, so that in a single operation, the frame member and the plate are shaped and are subsequently separated from each other. Both the superplastic forming and pressing processes are also suitable for providing formations for tank covers and the like, as well as providing other formations, for example ridges or corrugations for strengthening the panel, cover portion and/or frame member.

Various aspects of the present invention are now described by way of example only, with reference to the accompanying drawings, in which:

FIG. 1 illustrates in section an edge portion of a solar heating panel in accordance with the present invention;

FIG. 2 illustrates the preform used for the heat absorbing panel and frame member of the embodiment shown in FIG. 1;

FIG. 3 shows an alternative method of joining the heat absorbing panel to the frame member shown in FIG. 1;

FIG. 4 illustrates in part sectional elevation an alternative method of securing a transparent cover to the solar heating panel shown in FIG. 1;

FIG. 7 illustrates in section a solar heating panel formed in accordance with the present invention, suitable for use in a thermosiphon heating system.

Figure 5:
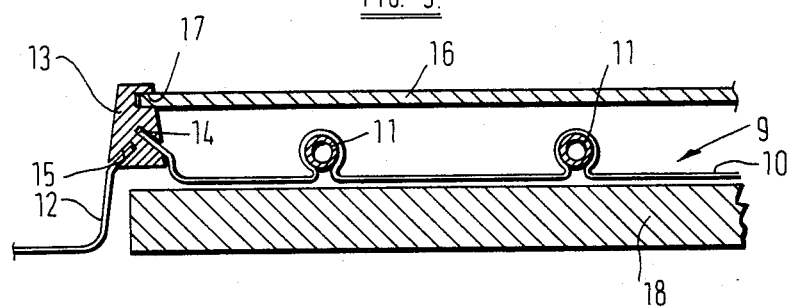
FIG. 5 illustrates in section an edge portion of an alternative embodiment of the invention.

As illustrated in FIG. 1, a solar heating panel comprises a substantially rectangular heat absorbing tray shaped plate member 10 having a serpentine tube 11 partially embedded therein. The heat absorbing tray shaped plate member 10 is surrounded by a sheet metal frame member 12 by means of a continuous rubber moulding 13, the outer periphery of the plate 10 and inner periphery of the frame member 12 engaging in slots 14 and 15 respectively, in the rubber moulding 13. A glass cover 16 which overlies the plate 10, is also retained in position in a recess 17 in the rubber moulding 13. A preformed rigid heat insulating sheet 18 is provided in the cavity below the plate 10 and within the frame member 12.

The plate 10 and frame member 12 are formed from a superplastic aluminium alloy. A sheet 19 of the superplastic aluminium alloy is deformed superplastically about the serpentine tube 11, in accordance with British Patent Specification No. 1565092, to form the plate 10 and at the same time the frame member 12. The formed sheet 19 is then cut around the horizontal portion 20, which defines the outer periphery of the plate 10 and the inner periphery of the frame member 12, along the vertical line X—X, to separate the plate 10 from the frame member 12. The frame member 12 is then inverted and the plate 10 and frame member 12 are assembled into the solar heating panel described above.

In the above embodiment, the rubber moulding 13 is a poor conductor of heat and consequently provides adequate thermal insulation between the heat absorber plate 10 and the frame member 12. The moulding 13 may be made from materials which are not such good thermal insulators, by positioning an insulating bead 21 between the plate 10 and moulding 13 as illustrated in FIG. 3. This bead 21, may conveniently be formed from a slit tube, of heat insulating material, which is placed over the periphery of the plate 10. Further slots may be provided in the moulding 13, into which pressure strips made of plastic, hard rubber or metal may be inserted, to apply a clamping pressure to the portions of the plate 10, frame member 12 and cover 16, which are engaged in the moulding 13.

As illustrated in FIG. 4, a moulded transparent plastics cover 25 may be used in place of the glass cover 16 of the embodiment described above. In this case, a flange portion 26 around the periphery of the cover 25 may engage in the same slot 27 in the moulding 28, as the frame member 12. Alternatively, the moulded plastics cover may be arranged to engage a suitable formation in the frame member 12. Where moulded plastics covers 25 are used, the cover will provide a continuous weather protection and consequently there is no need for the moulding 28 to be continuous around the periphery of the plate 10, as is the case in the embodiment shown in FIG. 1. The moulding 28 may consequently be replaced by extruded strips.

Figure 6:
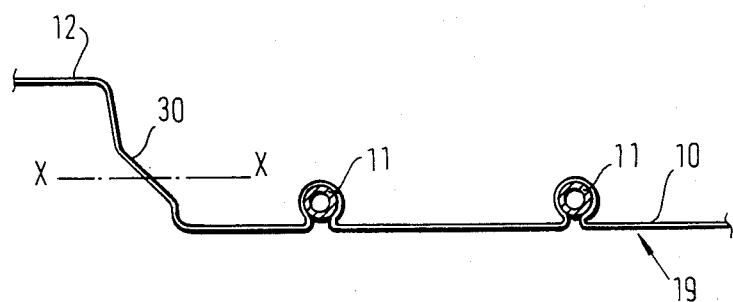
FIG. 6 illustrates the preform used to form the heat absorbing panel and frame member of the embodiment shown in FIG. 5.

In the embodiment illustrated in FIGS. 5 and 6, the outer periphery of the plate 10 and the inner periphery of the frame member 12 are inclined and engage in similarly inclined slots 14 and 15 in the moulding 13. By modifying the design of the plate 10 and frame member 12 in this manner, when the plate 10 and frame member 12 are formed in a single sheet 19, as illustrated in FIG. 6, the portion 30 defining the outer periphery of the plate 10 and the inner periphery of the frame member 12 will be inclined and may consequently be separated with a horizontal sawcut along the line X—X, thus easing this stage of the method of manufacture.

In the thermosiphon solar collector system, the solar collector panel 9 is connected to a storage tank 35, as illustrated in FIG. 7. When the solar panel is installed, the storage tank 35 is positioned above the collector panel 9 so that as the heat exchange fluid, for example water, is heated up in the collector panel 9, the thermosiphon action will cause it to move upwardly through the channel provided in the collector panel 9 and into the storage tank 35, to be replaced in the collector panel 9 by relatively cool fluid from the storage tank 35. In this manner the fluid is continuously circulated through the collector panel 9 without the need for external pumping means. Hot water may be tapped off from the storage tank 35, as and when required.

The thermosiphon solar collector illustrated in FIG. 7 is of similar basic construction to the panel illustrated in FIG. 1. A serpentine tube 11, with parallel runs across the width of the panel 9, forms the channel for heat exchange fluid. The ends of the tube 11 are connected to the storage tank 35, which is positioned along one of the ends of the panel 9, which is parallel to the parallel runs of the serpentine tube 11, a run of tube (not shown) being provided between the most distant end of the serpentine tube 11 and the tank 35 to form an outlet from the tank 35 into the panel 9 and a run of tube 36 between the nearer end of the serpentine tube 11 and the tank 35 forming an inlet into the tank 35 from the panel 9. The serpentine tube 11 and runs of tube from the tank 35 to the ends of the serpentine tube 11, are embedded in the heat absorbing plate 10.

The collector panel 9 is mounted in a frame member 12 and provided with a glass cover 16, these various components being joined together by a suitable continuous rubber moulding 13, in the manner described with reference to FIG. 1. The frame member 12 is provided with a portion 38 which forms a cover for the storage tank 35.

The cavity defined by the collector panel 9 and frame member 12 is filled with heat insulating material, in order to avoid heat losses from the panel 9 and storage tank 35.

The heat absorbing plate 10 and frame member 12 may conveniently be formed from a superplastic aluminium alloy using the techniques described above. In this embodiment, the tank cover portion 38 of the frame member 12 will be formed at the same time as the serpentine tube 11 is embedded in the plate 10 and the plate 10 and remainder of the frame member 12 are shaped.

Various modifications may be made without departing from the invention. For example, while heat exchangers formed in accordance with the present invention are particularly suitable for use as thermal collectors in solar heating systems, they may be used for other purposes, for example, thermal radiators.

I claim:

1. A method of forming a heat exchanger comprising the steps of forming a sheet of material into a frame and a heat absorbing panel with a tubular element partially embedded therein, deforming the sheet about the tubular element, forming the outer portions of said sheet into a first upwardly extending section, forming said outer portion of said first upwardly extending section into an outwardly extending section and forming the outer portion of said outwardly extending section into a second upwardly extending section, severing said sheet in the central portion of said outwardly extending section to define the outer periphery of said panel and the inner periphery of a frame member, securing an insulative jointing member to the outer periphery of said panel, inverting said frame mebmer and securing the portion of the inverted frame in said insulative jointing member in spaced relationship to said panel.

2. A method according to claim 1 in which the integral panel and frame member are parted with a suitable cutting tool.

3. A method according to claim 2 in which the portion of the formed sheet, defining the adjoining peripheries of the integral panel and frame member is inclined, so that the integral panel and frame member may be parted with a cut which is parallel to the general plane of the formed sheet.

4. A method according to claim 1 in which the integral panel and frame member are formed by a pressing process.

5. A method according to claim 4 in whch the integral panel and frame member are parted as part of the pressing operation.

6. A method according to claim 1 in which the integral panel and frame member are formed from a superplastic metal using a superplastic forming process in which, the sheet is deformed about the tube or tubes defining the channel of the panel, and the integral panel and frame member are formed in a single operation.

* * * * *